Feb. 9, 1960 E. M. GYORGY 2,924,792

WAVE GUIDE FILTER

Filed March 23, 1956

INVENTOR
E. M. GYORGY
BY Roy M. Porter, Jr.
ATTORNEY

United States Patent Office 2,924,792

Patented Feb. 9, 1960

2,924,792

WAVE GUIDE FILTER

Ernst M. Gyorgy, Morris Plains, N.J., assignor to Bell Telephone Laboratories, Incorporated, New York, N.Y., a corporation of New York Application March 23, 1956, Serial No. 573,364

6 Claims. (Cl. 333—73)

This invention relates to electromagnetic wave transmission systems and, more particularly, to wave guide filters for use in such systems.

Wave guide filters have usually been constructed by forming a resonant cavity between two conductive elements in the wave guide or by a single conductive element in the form of a resonant iris. These conductive elements have taken the various forms of transverse partitions, posts, or screws and their operation as frequency filters is based upon the multiple wave reflections which take place longitudinally in the guide. In all cases, conductive elements are used which must be attached in some manner to the guide walls. Furthermore, the frequency at which resonance occurs is critically dependent upon the exact size of the elements and upon their longitudinal position in the guide, quantities which are often difficult, if not impossible, to accurately control. For many applications, it is desirable to have a filter element which is made of nonconductive material and has easily controlled dimensions. These characteristics are of particular importance, for example, in microwave transmission systems for extremely high frequencies, especially in the millimeter wavelength range, where the conductive filter elements would need to be of extremely small physical size. Such small physical structures are difficult to fabricate precisely and the problems of electrical contact between the conductive elements and the wave guide walls are greatly increased. Furthermore, conductive surfaces in such close physical proximity to one another increase the danger of breakdown through arcing.

It is therefore an object of the present invention to introduce a frequency selective response into electromagnetic wave guide circuits with resonant elements which are easy to fabricate and install precisely.

It is a more specific object of the invention to provide a conductively bounded wave guide with a frequency selective response by means of nonconductive resonant elements.

The operation of the present invention is based to a large degree upon the well known wave guide phenomenon called cutoff. This phenomenon can be described as that property of wave guides which makes possible the free propagation of wave energy above a certain frequency, known as the cutoff frequency, and no propagation below this frequency. The phenomenon can be better understood by considering a wave as being composed of plane wave components which are directed, not along the axis of the guide, but at an angle to the guide walls. These plane waves or "rays" are reflected by the walls and combine in the interior of the guide to form the required wave configuration. At frequencies far above cutoff, these rays are incident on the guide walls at a small angle. As cutoff is approached, however, this angle becomes increasingly larger until, exactly at cutoff, the rays are directed at right angles to the guide walls. Below the cutoff frequency, the rays cannot be formed, and above cutoff the rays are propagated. Exactly at the cutoff frequency, however, the rays are formed but do not propagate down the guide, being reflected back and forth between the guide walls at the same point at which they are excited. This cutoff condition can be considered quasi-resonant in that these multiple transverse reflections are similar in many respects to the longitudinal reflections which take place between conductive obstacles displaced longitudinally in a wave guide. This consideration has heretofore been purely academic since no actual propagation takes place at cutoff. The frequency of cutoff has been recognized to be a function of the actual mode or wave configuration of the energy within the guide. That is, for any particular mode, the cutoff wavelength is directly proportioned to the dimensions of the guide but with different constants of proportionality for different modes. The rank of these modes is determined by the cutoff wavelength, the highest order modes being those with the smallest cutoff wavelength. The cutoff wavelength is also known to be directly proportional to the square root of the relative dielectric constant of the medium in which the wave is supported.

For the proper frequency range, a wave guide is capable of supporting a large number of transmission modes which are essentially uncoupled. That is, in the absence of a discontinuity, energy in any particular mode launched in the guide will remain in that mode. In the region of a discontinuity, however, modes other than the exciting mode can be generated. All other factors being equal, the exciting mode will tend to be coupled to those modes which have a similar wave configuration. For the purposes of the present invention, any two modes which have wave configurations such that the direction and the intensity of the electric field components are substantially similar, will be called "energetically coincident pairs." Wave energy will be coupled between energetically coincident pairs in the region of a discontinuity if all other factors are equal.

In accordance with the present invention, a conductively bounded wave guide is loaded by an element of dielectric material which is suitably shaped and positioned to produce in the region of the element an electric field similarity between two selected modes, i.e., to produce an energetically coincident pair capable of energy transfer. The initial dimensions of the guide are chosen so that the lower order one of these two modes is capable of excitation and propagation in the unloaded guide while the higher order one is not. At the same time, the material comprising the dielectric element and the dimensions of the element relative to the dimensions of the guide are chosen so that the higher order one of these two energetically coincident modes is at cutoff for a given frequency. That is, the cutoff frequency of the higher order mode is depressed in the region of the dielectric element so as to fall within the excitation range. It will be noted that if the lower order mode was at cutoff in the loaded guide, neither of the energetically coincident modes could be supported in the unloaded guide.

Under the above-described conditions, it can be seen that if the guide is excited by a broad frequency band in the lower order mode, energy is coupled to the higher order cutoff mode at the cutoff frequency in the region of the dielectric discontinuity, due to their coincidence of energy distribution at that point. Furthermore, since cutoff represents a quasi-resonant condition having a relatively high energy storage capacity, energy at the cutoff frequency will exhibit a preference for the cutoff mode. Since this mode cannot propagate down the guide at the cutoff frequency, the region of the dielectric discontinuity will appear to incident wave energy at the cutoff frequency as a short circuit. This frequency will therefore by reflected back from the discontinuity. At frequencies above this cutoff frequency, the wave energy is freely transmitted through the loaded region in the exciting mode. At frequencies below cutoff, conversion to the cutoff mode cannot take place and the wave energy again freely passes the loaded region. Such a structure is therefore seen to have the characteristics of a band rejection filter. Since this structure requires only a single dielectric element, the problems of electrical contact with the guide walls and of breakdown through arcing are substantially eliminated.

In one principal embodiment of the invention, a cylindrical wave guide of circular cross section is loaded with a dielectric sphere having a dielectric constant substantially greater than the dielectric constant of the surrounding medium. The sphere is positioned axially within the guide and the guide is excited in the dominant $TE_{11}$ mode. Since the electric field tends to concentrate in the dielectric material, the next higher energetically coincident mode which is favored by such a field distribution is the $TM_{11}$ mode also having a concentration of the electric field at the center of the guide. At the frequency for which the loaded guide is in a cutoff condition for the $TM_{11}$ mode, a resonant effect can be observed. This resonance can be considered as arising from a selective mode conversion from the dominant to the $TM_{11}$ mode at the cutoff frequency of the latter in the loaded section of guide as described above. Obviously, the frequency of resonance can be varied by varying the size of the sphere with respect to the guide dimensions and the relative dielectric constant of the material in the sphere. The frequency of resonance can be further controlled by making the shape and position of the dielectric material such that other modes having different cutoff frequencies are energetically coincident and hence more favorable for formation. The sphere is chosen merely as the simplest mechanical form which is easy to fabricate precisely. It should also be noted that the longitudinal position of the dielectric element along the guide axis is immaterial, an advantage not shared by many other filter elements.

A modification of this embodiment which has a distinct added advantage is the substitution of an element composed of gyromagnetic material rather than nonmagnetic dielectric material. In the presence of a magnetic field, the effective permeability of such material changes, thus changing the transmission characteristics of the element. By varying the effective permeability of the element, its cutoff properties are changed, thereby allowing electrical tuning of the resonant frequency.

It is apparent that instead of using an element of material with a high dielectric constant located in a region of maximum electric field intensity, an element of material with a high permeability could be used in a region of maximum magnetic field intensity. That is, a body having a higher index of refraction than the surrounding medium could be so placed in a wave guide as to produce coincidence, magnetically or electrically, between two modes and to produce cutoff in the higher order mode of the two.

Some of the features of the present invention are the simple mechanical form of the frequency-selective element, the absence of conductive material within the guide, and the independence from longitudinal position along the guide.

One advantage which resides in the use of nonconductive material in the resonant element is the elimination of the necessity for electrical contact with the walls of the wave guide. Another advantage residing in the use of such material is a substantial reduction in the danger of electrical breakdown through arcing, a danger which is always enhanced by the use of conductive elements within the guide.

These and other objects and features, the nature of the present invention and its various advantages, will appear more fully upon consideration of the accompanying drawings and the following detailed description of those drawings.

Figure 1:
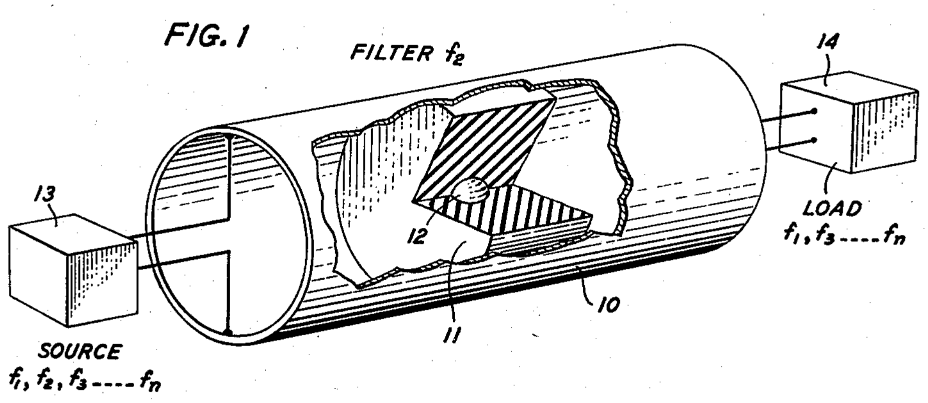
Fig. 1 is a partially sectioned perspective view of one principal embodiment of the invention showing a dielectric sphere as a resonant element in a circular wave guide in accordance with the principles of the invention.

Referring more particularly to Fig. 1, a first principal embodiment of the invention is shown comprising a section of cylindrical wave guide 10 having a circular cross section. Guide 10 is a conductively bounded wave guide containing a dielectric medium of material generally used for such purposes which may, for example, be air or polyethylene. Located within and completely filling one portion of guide 10 is plug 11 of dielectric material preferably having a dielectric constant substantially equal to the dielectric constant of the medium within the remainder of guide 10. Plug 11 provides mechanical support for sphere 12, a uniform dielectric sphere supported coaxially at the center of guide 10. Sphere 12 is composed of dielectric material having a relative dielectric constant substantially larger than the dielectric constant of the material comprising plug 11 or that of the medium in the remainder of guide 10. Sphere 12 may, for example, be composed of alumina, with a relative dielectric constant of nine, mycalex with a relative dielectric constant of eight, or barium titanate with a dielectric constant of one hundred. Plug 11 may then be composed of polyfoam having a dielectric constant of 1.05 and the remainder of guide 10 may be air-filled.

One end of guide 10 is excited by source 13 of electromagnetic wave energy in the lower order mode of an energetically coincident pair for the dielectric distribution shown. Source 13 is capable of exciting a large frequency range of wave energy in guide 10, the frequencies $f_1$, $f_2$, $f_3$ . . . $f_n$, each representing a successively higher center frequency of a relatively narrow band of frequencies. At the other end of guide 10 is a load 14 for all of these frequency bands except the one centered on $f_2$. In the embodiment of the invention shown, a preferred energetically coincident pair is the dominant $TE_{11}$ mode and the $TM_{11}$ mode, each having a high concentration of electric field at the center of guide 10 for the dielectric loading shown. The dimensions of guide 10 are chosen so that the unloaded portions of the guide are capable of supporting all of the excitation frequencies $f_1$, $f_2$, $f_3$ . . . $f_n$ in the lower order $TE_{11}$ mode and none of these frequencies in the higher order $TM_{11}$ mode. That is, the lowest frequency $f_1$ is above the cutoff frequency of the $TE_{11}$ mode and the highest frequency $f_n$ is below the cutoff frequency of the $TM_{11}$ mode.

In accordance with the present invention, the material and the size of sphere 12 are chosen so that guide 10 in the region of sphere 12 is at cutoff for the $TM_{11}$ mode for the frequency $f_2$. That is, the cutoff frequency of the $TM_{11}$ mode is depressed by the dielectric loading of sphere 12 to the frequency $f_2$. This frequency $f_2$ must therefore be below the cutoff frequency of the $TM_{11}$ mode in the unloaded guide and above the cutoff frequency of the mode exciting guide 10, the dominant $TE_{11}$ mode. As stated above, the $TM_{11}$ mode is chosen because the electric field of the exciting wave in the vicinity of sphere 12 tends to concentrate in the dielectric material with the higher dielectric constant. Such a field distribution is energetically favorable for the excitation of the $TM_{11}$ mode in the vicinity of sphere 12, this mode also having a maximum electrical field intensity at the center of the guide. It is therefore to be expected that some energy in the region of sphere 12 will be coupled into this mode. Since this mode is at cutoff the plane wave components of the mode can be said to be directed at right angles to the walls of guide 10 and reflect back and forth between these walls, never leaving the vicinity of sphere 12. Furthermore, since all other energetically favorable modes are of a higher order, they must be below cutoff in the region of sphere 12 at frequency $f_2$ and will therefore not be generated. The high energy storage capacity of the sphere region due to the cutoff condition allows the energy at the cutoff frequency $f_2$ to go into this cutoff mode. Since this energy cannot propagate beyond sphere 12, the cutoff condition presents an effective short circuit to this frequency. Reflections at this frequency therefore occur in the region of sphere 12, the reflected waves returning again to the dominant $TE_{11}$ mode on leaving the region of sphere 12. It is seen therefore that the dielectric sphere 12 acts as a filter element giving a band rejection characteristic, the midband frequency of which is the cutoff frequency of the $TM_{11}$ mode for the loaded guide. The response has a very high loaded Q, Q's up to 900 being possible, with a return loss on the order of one decibel.

Sphere 12 in guide 10 of Fig. 1 may also be composed of material having a permeability which is substantially greater than the permeability of plug 11. In accordance with the invention, the material and size of sphere 12 are then chosen so that guide 10 is at cutoff for frequency $f_2$ in the $TM_{01}$ mode. The $TM_{01}$ mode is chosen since it has a high concentration of magnetic field at the center of guide 10 for the permeability distribution presented by sphere 12. That is, if guide 10 is excited in the dominant $TE_{11}$ mode, the magnetic field of the exciting wave will tend to concentrate in the permeable material of sphere 12. Such a field distribution is energetically favorable for the excitation of the $TM_{01}$ mode in the vicinity of sphere 12, this mode also having a maximum magnetic field intensity at the center of the guide. The loading of permeable sphere 12 will therefore result in a band rejection filter, the midband frequency of which is the cutoff frequency of the $TM_{01}$ mode for the loaded guide.

It should be apparent that increasing the diameter of sphere 12 lowers the resonant frequency since it lowers the cutoff frequency of the loaded guide. Furthermore, increasing the dielectric constant or permeability of the material in sphere 12 also lowers the resonant frequency since it also lowers the cutoff frequency of the loaded guide. These effects can be better seen by considering Fig. 2.

Figure 2:
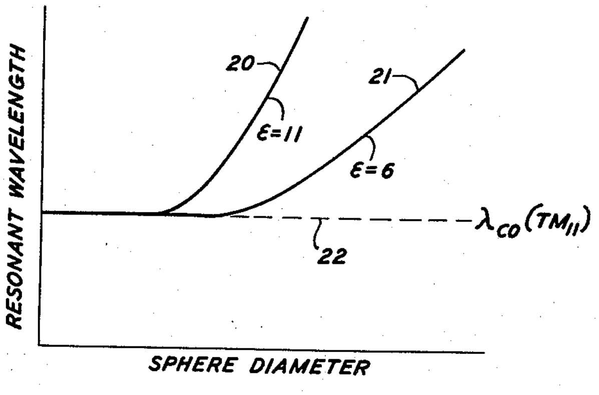
Fig. 2 shows the characteristic response of the resonant wavelength versus sphere diameter for material of different dielectric constants in the embodiment of Fig. 1.

Fig. 2 is a graph of the response of the filter element of Fig. 1, plotting the resonant wavelength as ordinates against the sphere diameter as abscissa. Curve 20 represents the response of a sphere having a dielectric constant of eleven and curve 21 represents the response of a sphere having a dielectric constant of six. It will be noted that at the smaller sphere diameters the resonant wavelength asymmetrically approaches the cutoff wavelength of the $TM_{11}$ mode, represented by dashed line 22 in Fig. 2. This is to be expected since resonance occurs at the cutoff wavelength of this mode for the loaded portion of the guide. At larger sphere diameters, it can be seen that the resonant wavelength becomes proportional to the sphere diameter as the sphere becomes a larger portion of the guide cross section. Furthermore, the slope of the curves in this region are proportional to the square root of the dielectric constants of the spheres. This is also to be expected since as the sphere becomes a larger portion of the guide cross section, the electrical width of the sphere becomes a dominating portion of the electrical width of the guide.

Figure 3:
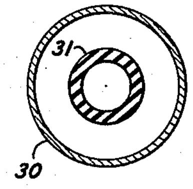
Fig. 3 is a cross-sectional view of another embodiment of the invention showing a circular wave guide with dielectric loading in the form of a toroid.
Figure 4:
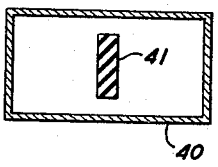
Fig. 4 is a cross-sectional view of another embodiment of the invention showing a rectangular wave guide with dielectric loading in the form of a rectangular cube.
Figure 5:
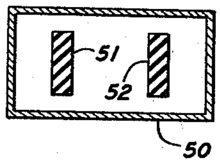
Fig. 5 is a cross-sectional view of another embodiment of the invention showing a rectangular wave guide with dielectric loading in the form of two rectangular cubes.

It should be remembered that the effect described above is not restricted to a sphere in a circular wave guide, nor to cutoff of the $TM_{11}$ mode. It is only necessary to excite the guide in some desired mode, choose the next higher mode having an energetically coincident electric or magnetic field distribution, and load the guide with dielectric or permeable material in the region of maximum electric or magnetic field intensity of the higher mode such that the loaded guide is at cutoff for the desired frequency in that higher mode. In Figs. 3, 4 and 5 are shown other suitable arrangements for producing resonance in a dielectric loaded wave guide.

In Fig. 3 is shown a cross-sectional view of another embodiment of the invention comprising a sectional of cylindrical wave guide 30 having a circular cross section. Coaxially located within guide 30 is a toroid 31 of dielectric material having a dielectric constant substantially greater than the dielectric constant of the remainder of the medium within guide 30. The structure of Fig. 3 operates as a band rejection filter in much the same manner as the structure shown in Fig. 1. Guide 30 may be excited in the $TE_{01}$ circular electric mode rather than the dominant $TE_{11}$ mode as is guide 10 in Fig. 1. Instead of exciting the $TM_{11}$ mode at cutoff, as the sphere 12 in Fig. 1 does, toroid 31 in Fig. 3 will then excite the $TE_{02}$ mode. This becomes readily apparent when it is remembered that the maximum electric field concentration for the $TE_{01}$ and $TE_{02}$ modes occurs in annular regions between the center of the guide and the guide walls, and that the electric field lines are circular in both of these modes. Similarly, permeable material in toroid 31 would produce coupling between the $TM_{01}$ and $TM_{02}$ modes due to their similarity of magnetic field patterns.

Fig. 4 shows a cross-sectional view of another embodiment of the invention comprising a section of rectangular wave guide 40 having a cube 41 of dielectric material located therein. Cube 41 is centrally located between the narrower walls of guide 40. If guide 40 is excited in the dominant $TE_{10}$ mode, it can be seen that the next higher energetically coincident mode having an electric field distribution corresponding to a concentration of electric field intensity at the center of the guide is the $TE_{30}$ mode. The structure of Fig. 4 would therefore reject the frequency band centering on the $TE_{30}$ cutoff frequency of the loaded section. Of course, the field distribution would also favor the formation of even higher order modes having electric field concentrations at the center of guide 40, such as, for example, the $TE_{50}$ and the $TE_{70}$ modes, but these modes would all be below cutoff at the cutoff frequency of the $TE_{30}$ mode and therefore not be generated at the resonant frequency.

Fig. 5 is a cross-sectional view of another embodiment of the invention showing a band rejection filter comprising a section of rectangular wave guide 50 containing two cubes 51 and 52 of dielectric material having a dielectric constant substantially greater than the dielectric constant of the surrounding medium. Cube 51 is located one-quarter of the way between the narrower walls of guide 50 and cube 52 is located three-quarters of the way. If guide 50 is excited in the dominant $TE_{10}$ mode, it can be seen that the energetically coincident modes favorable for generation in the regions of cubes 51 and 52 are the higher order modes having an electrical field concentration in the regions of cubes 51 and 52. The lowest order mode having the required electric field distribution is the $TE_{20}$ mode. The structure of Fig. 5 would therefore act as a band rejection filter centered on the cutoff frequency of the $TE_{20}$ mode for the loaded region of guide 50, all higher order modes being incapable of excitation at the cutoff frequency of the $TE_{20}$ mode.

Figure 6:
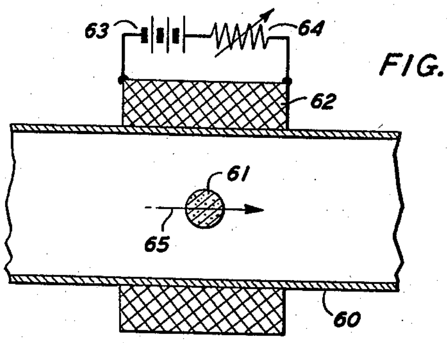
Fig. 6 is a longitudinal section of another embodiment of the invention employing gyromagnetic material in the frequency-selective element.

In Fig. 6 is shown a longitudinal section of a modification of the filter depicted in Fig. 1 comprising a section of cylindrical wave guide 60 having a circular cross section.

Located within guide 60 is a sphere 61 having its center on the longitudinal axis of guide 60. Sphere 61 is composed of gyromagnetic material such as that described in the copending application of C. L. Hogan, Serial No. 252,432, filed October 22, 1951, now United States Patent 2,748,353, issued May 29, 1956, and having the properties described by A. G. Fox, S. E. Miller and M. T. Weiss in "Behavior and Applications of Ferrites in the Microwave Region," Bell System Technical Journal, volume 34, No. 1, January 1955. These gyromagnetic materials, commonly known as ferrites, have unique properties at microwave frequencies, being characterized by a tensor form of permeability which varies with the magnetic field within the material and the frequency of the applied wave. Such materials also have a high dielectric constant on the order of ten to twenty.

Sphere 61 in guide 60 is magnetically polarized by a static field directed along the axis of guide 60 in the direction of arrow 65. Suitable means for producing the necessary longitudinal magnetic field surrounds sphere 61 which means may be, for the purposes of illustration, a solenoid 62 mounted upon the outside of guide 60 in the vicinity of sphere 61. Solenoid 62 is supplied by a source 63 with energizing current to enable it to establish the necessary magnetic field. Variable resistor 64 is connected in series with source 63 to provide a variation in the magnitude of the energizing current, thereby changing the strength of the magnetic field in sphere 61. The effect of varying this field is to change the effective permeability of the gyromagnetic material comprising sphere 61.

In operation, a change in effective permeability of the material in sphere 61 will change the electrical dimensions of sphere 61, thereby also changing the cutoff frequency of the higher mode, in this case the $TM_{11}$ mode, and hence the resonant frequency of the filter. It can therefore be seen that the filter depicted in Fig. 6 has a resonant frequency which can be controlled electrically. It is apparent that the filter can be tuned while in operation and from a remote point by means which are completely electrical.

In all cases, it is to be understood that the above-described arrangements are simply illustrative of a small number of the many possible specific embodiments which can represent application of the principles of the invention. Numerous and varied other arrangements can readily be devised in accordance with these principles by those skilled in the art without departing from the spirit and scope of the invention.

What is claimed is:

1. In combination, a conductively bounded dielectric transmission medium having first and second ends, a source of wave energy of a first wave mode including bands of wave energy centered about frequency components $f_1$, $f_2$, $f_3$, . . . $f_n$ connected to said first end, said transmission medium being above cutoff for and therefore capable of supporting said energy in said first wave mode at all of said frequencies, said transmission medium being below cutoff for and therefore incapable of supporting said energy in a selected second wave mode at all of said frequencies, means for utilizing said applied frequency components $f_1$, $f_3$, . . . $f_n$ to the exclusion of the frequency components $f_2$ connected to said second end, and means for reflecting frequency components $f_2$ inserted in said medium between said ends, said reflecting means comprising a region presenting an index of refraction to wave energy centered about frequency components $f_2$ greater than that of its surrounding material disposed at a location whereat the direction and the relative intensity of the field components of said first and said second mode are similar, said reflecting means causing said selected mode to be at cutoff at frequency $f_2$.

2. The combination according to claim 1 in which said conductive boundary is circular in cross section and said region of greater index of refraction comprises a sphere located coaxially within said boundary.

3. The combination according to claim 2 in which said sphere comprises a magnetically polarized gyromagnetic medium, said polarization being in a direction at right angles to said circular cross section.

4. The combination according to claim 1 in which said conductive boundary is circular in cross section and said region of greater index of refraction comprises a toroid positioned symmetrically within said boundary.

5. The combination according to claim 1 in which said conductive boundary is rectangular in cross section and said region of greater index of refraction comprises at least one rectangular cube positioned between oppositely disposed portions of said conductive boundary.

6. In combination, a conductively bounded dominant mode wave energy transmission path having first and second terminal ends, a source of dominant mode wave energy having frequency components falling within the range of frequencies between the dominant mode cutoff frequency and the next higher order mode cutoff frequency connected to said first end, means for receiving reflected energy within a narrow band of frequencies centered about one frequency within said range also connected to said first end, and means comprising a region having a higher index of refraction than that of its surrounding medium located in said path only at the locations at which the vector field components of a selected higher order mode and said dominant mode are similar, said index of refraction having a value relative to the dimensions of said region and to the dimensions of said conductive boundary that causes said selected mode to be at cutoff at said one frequency.

References Cited in the file of this patent

UNITED STATES PATENTS

| | | |
|---|---|---|
| 2,629,773 | Hall | Feb. 24, 1953 |
| 2,739,288 | Riblet | Mar. 20, 1956 |
| 2,745,069 | Hewitt | May 8, 1956 |
| 2,798,205 | Hogan | July 2, 1957 |
| 2,806,972 | Sensiper | Sept. 17, 1957 |

OTHER REFERENCES

Fox et al.: Bell System Technical Journal, vol. 34, No. 1, January 1955, pages 22–26.

Bell publication of record, page 38, pages 42, 44 and page 45.